UNITED STATES PATENT OFFICE.

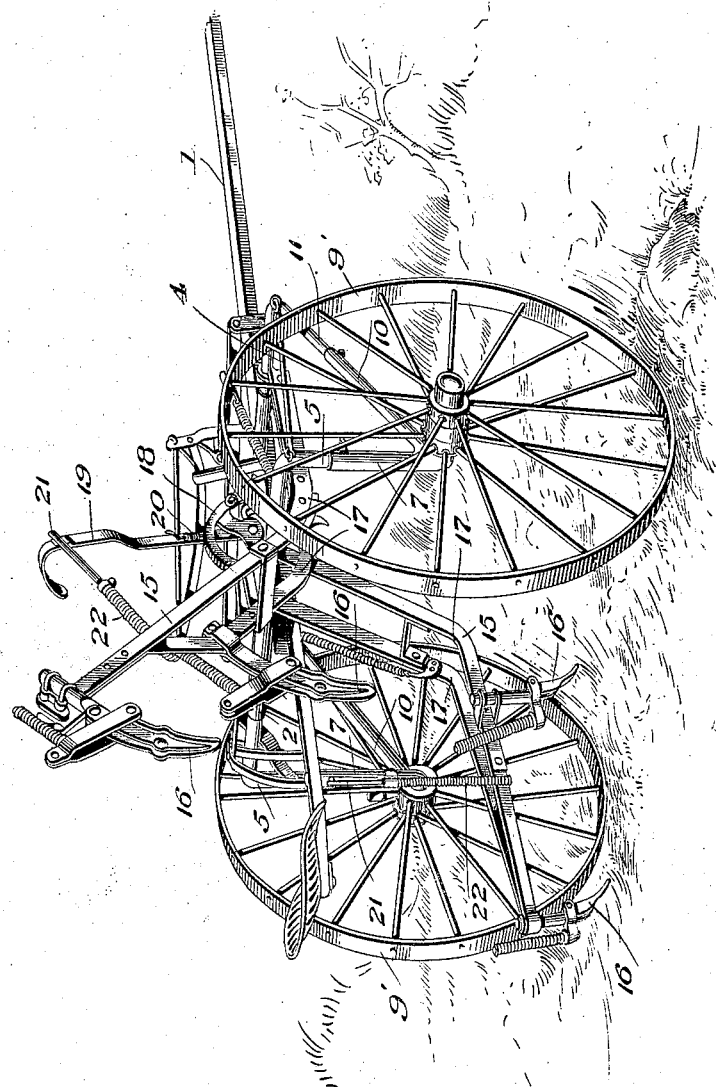

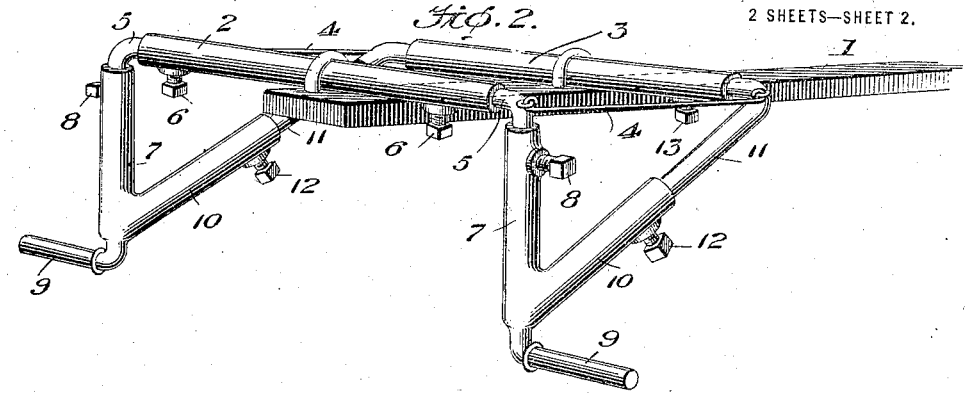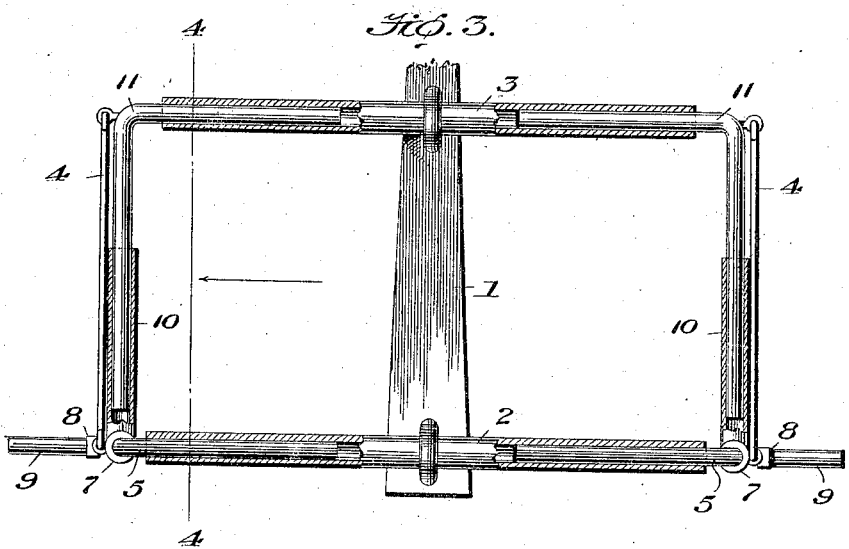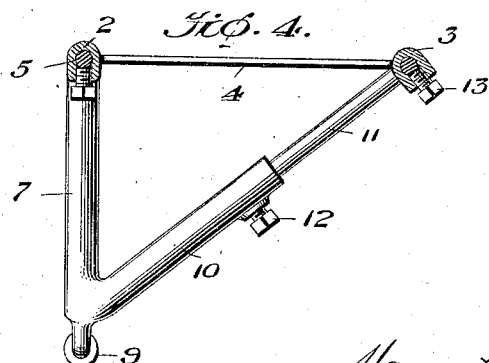

HAYS WARDLOW, OF NAYLOR, MISSOURI, ASSIGNOR OF ONE-HALF TO LOUIE HERING, OF NAYLOR, MISSOURI.

WHEEL-CULTIVATOR.

1,299,073.        Specification of Letters Patent.        Patented Apr. 1, 1919.

Application filed July 27, 1918.   Serial No. 246,998.

*To all whom it may concern:*

Be it known that I, HAYS WARDLOW, a citizen of the United States, residing at Naylor, in the county of Ripley and State of Missouri, have invented certain new and useful Improvements in Wheel-Cultivators, of which the following is a specification.

My invention relates to novel improvements in wheel or straddle row cultivators. The prime object of my invention is to so construct a cultivator frame that it will be simple, strong, economical, durable and efficient, and may be readily adjusted so as to suitably vary the width and height thereof.

Another object of the invention is to provide a cultivator with sufficient clearance space beneath its arched frame as to avoid contact with stumps, large stones, and other solid obstructions which may be strewn in its path during the cultivating operation, and also a cultivator which may be utilized to cultivate corn of a high growth without breaking it down, or otherwise destroying or effacing it in any manner.

A further object of the invention is to so construct and secure the cultivator beams that they may be readily swung upward to a position directly beneath the rear arch, so that the cultivator blades will be secured in such a position as to avoid contact with stumps, and other obstructions when in raised position, and when lowered into contact with the earth will serve to plow or break up the soil, and will cultivate a field of corn of considerable growth without contacting therewith.

The foregoing and such other objects as may appear from the ensuing description are attained by the novel construction, combination, arrangement and location of the parts hereinafter more fully described, illustrated in the accompanying drawings, and particularly pointed out in the claims appended hereto, it being understood that slight changes in the form, proportions and minor details of the construction may be resorted to without departing from the spirit or sacrificing any of the advantages of the invention.

In the accompanying drawings which form a part of the specification it will be seen that:—

Figure 1, is a perspective view of the cultivator embodying my invention.

Fig. 2, is a detail perspective view of my improved cultivator frame and pole with the other parts of the cultivator removed.

Fig. 3, is a plan view part in section of the frame as shown in Fig. 2, and

Fig. 4, is a detail sectional view taken on the line 4—4, Fig. 3.

Similar numerals of reference are employed to designate corresponding parts throughout the several figures of the drawings.

The numeral 1 indicates the pole which is secured at its rear end to the arch tubular or pipe axle member 2, the pole being also suitably secured to the front tubular arch or pipe member 3, said pipe axle 2, and member 3 being securely connected together and braced apart by the rods or bars 4. Secured within the ends of the tubular axle 2 are the axle arms 5 each of which latter is bent at right angles as shown in Fig. 2, one member being adjustably secured by the set screws 6 within the tubular axle, and the other extending vertically downward and adjustably secured within the socket member 7 by set screws 8. Formed integral with each of the stub axles 9, the horizontal members being mounted within the hubs of the ground wheels 9′, are the socket members 7 and 10, the member 7 extending upward from the stub axle, while the member 10 is inclined upwardly and forwardly with respect to the stub axle, said socket members 10 being adapted to receive and retain within the same the arms 11, each of which latter is bent at right angles, one member being adjustably secured within said socket 10 by set screws 12, and the other extending transversely within the tubular member 3 where it is adjustably secured by set screws 13, said sockets, arms, tubular members and the connecting brace bars or rods 4, constituting the frame proper of my improved cultivator, it being understood that other or additional brace bars (not shown) may be utilized between the tubular arch members 2 and 3 to hold the frame solid and rigid.

Each of the cultivator or plow beams 15, as shown, are provided with two plows or cultivator blades 16 of the ordinary type of construction, and each forward end of the said beams is suitably secured by the usual hinged connection to the front arch member 3, each beam being formed with an abrupt bend or curved portion at the point 17, so that when the said beams are raised to their highest position the bent or curved portion thereof will rest directly beneath and in contact with the axle arch member 2 and thereby elevate the plows or blades 16 to such a position as to avoid stumps and other obstructions which may rest in their path. Secured to the frame in any suitable manner is a toothed quadrant 18 to which is secured in any desirable manner a lever 19 provided with a catch 20 to engage with the teeth of said quadrant, whereby in connection with the rod 21 provided with a coiled spring 22, secured to the beam 15, the lever may be set and secured to hold the plow beams and plows or blades to any height that is required to avoid the obstructions, as will be readily understood, by reference to Fig. 1 of the drawings. The other parts of the cultivator are of usual construction and need no particular mention.

When the solid arms 5 and 11 are adjusted and secured in their inward and downward position the frame will be three feet between the wheels and the arch members 2 and 3 will be three and a half feet high, but when the said arms are spread or adjusted and secured outward and upward to their full extent, the wheels will be five feet apart and the arch members 2 and 3 four and a half feet in height, the frame being readily adjusted to any position between said widths and heights that is necessary to suit the desired cultivation.

It will be readily perceived that my novel construction of frame may be attached to any ordinary double arch cultivator, and by securing a handle member to the rear portion of the beams, the cultivator may be used as a walking cultivator as well as a riding cultivator.

It will be readily obvious that one of the main principles of this invention is to furnish a cultivator with a clear space under the arch members of the frame, which will furnish sufficient space between the wheels and beneath the frame, to avoid all ordinary stumps and other stationary obstructions which may rest in the ground which is being cultivated or plowed, and which will serve to cultivate corn of higher and more mature growth without breaking it down or destroying it in any way than with an ordinary cultivator now employed for the purpose.

Having thus described my invention, what I claim and desire to secure by Letters Patent is:—

1. A cultivator comprising a frame mounted on wheels, said frame consisting of a front and a rear tubular arch member, stub axles, each of which is provided with an upright and a forwardly inclined integral socket member, said arms adjustably secured within said sockets and the front and rear arch members.

2. A cultivator comprising a frame mounted on wheels, said frame consisting of stub axles provided with an upright and a forwardly inclined integral tubular socket member, a tubular front and a tubular rear arch member, and arms adjustably secured within said socket members and said tubular arch members.

3. A cultivator comprising a frame mounted on wheels, said frame consisting of a front and a rear tubular arch member, stub axles, each of which is provided with an upright integral socket member and a forwardly inclined integral tubular socket member, arms adjustably secured within said socket members and the front and rear arch members, and brace rods connected with the front and rear arch members.

4. A cultivator comprising a frame mounted on wheels, said frame consisting of a front and a rear tubular arch member, stub axles provided with an upright tubular integral socket member and a forwardly inclined tubular integral socket member, arms adjustably secured within said socket and arch members, plow beams hinged to the front arch member, and means for elevating the plow beams into contact with the rear arch member to form a clear space below the arch members and between the wheels.

5. The combination with a frame mounted on wheels, said frame consisting of stub axles provided with a plurality of integral tubular socket members, a front and a rear tubular arch member, arms adjustably secured within said socket and arch members, of a plow beam hinged to the front arch member, said beam having an abrupt bent or curved portion intermediate its length adapted to contact with the rear arch member, when the beam is elevated to its highest position.

6. The combination with a frame, stub axles connected thereto and mounted on wheels, each stub axle provided with an upright tubular integral socket member and a forwardly and upwardly inclined integral tubular socket member, a front and a rear tubular arch member, of means adjustably connecting the said sockets and arch members for holding both stub axles in their proper positions.

7. The combination with a frame, stub axles connected thereto and mounted on wheels, each stub axle provided with a plurality of socket members, a front and a rear tubular arch member, of means adjustably connecting each socket and the front and rear arch members, and plow beams hinged to the front arch member.

8. The combination with a frame, stub axles connected thereto and mounted on wheels, each stub axle provided with a plurality of socket members, a front and a rear tubular arch member, brace rods connecting said front and rear arch members, of means adjustably connecting each socket and the front and rear arch members, and plow beams having an abrupt bend intermediate their ends, and hinged at their forward ends to the front arch member.

9. The combination with a frame, stub axles connected thereto and mounted on wheels, each stub axle provided with a plurality of tubular socket members, a front and a rear tubular arch member, of means adjustably connecting each socket and the front and rear arch members, and plow beams hinged to the front arch at their front ends, each beam having an abrupt bend intermediate its ends, and means for raising the said beams so that the bent portion will contact with the rear arch member.

HAYS WARDLOW.

Copies of this patent may be obtained for five cents each, by addressing the "Commissioner of Patents, Washington, D. C."